Dec. 31, 1968  R. E. LOOKABAUGH  3,419,323
EYE TESTING AND TRAINING APPARATUS INCORPORATING OPTICAL
PROJECTOR AND RELATIVELY ROTATABLE TARGET TEMPLATES
Filed Aug. 5, 1963
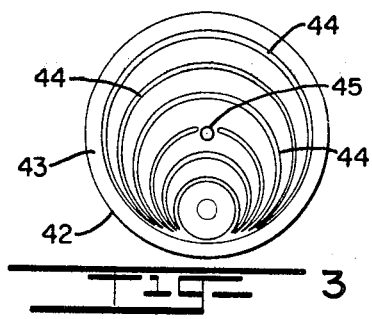
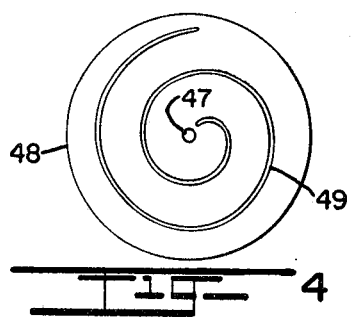
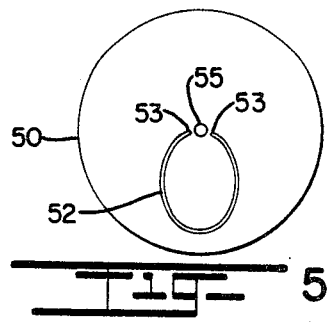
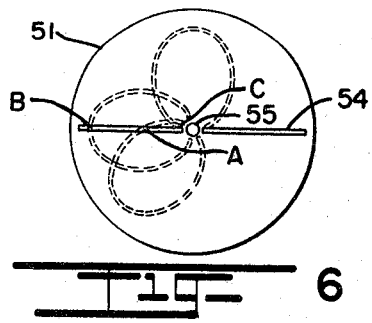
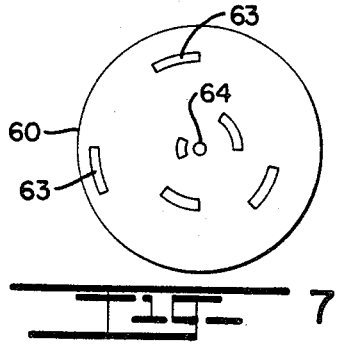
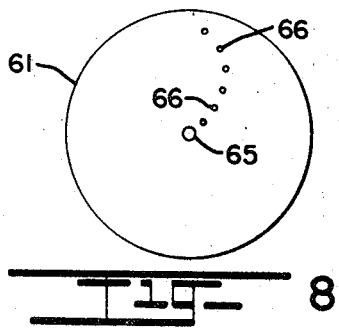
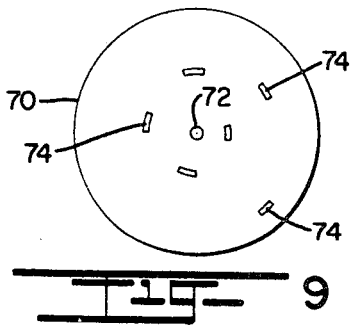
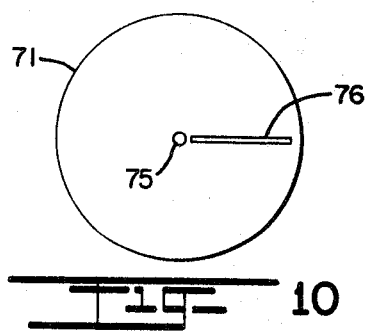
INVENTOR.
ROBERT E. LOOKABAUGH
BY
*John E. Reilly*
ATTORNEY

United States Patent Office

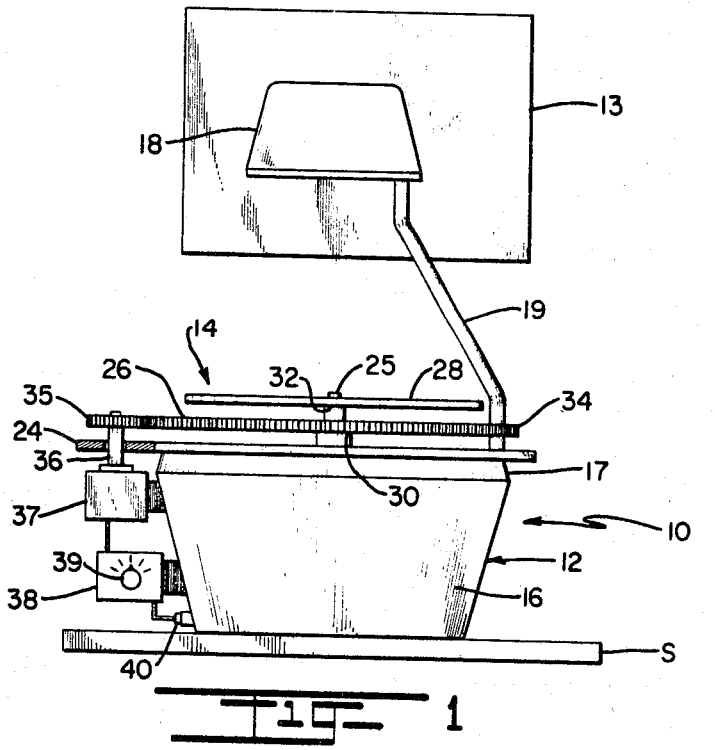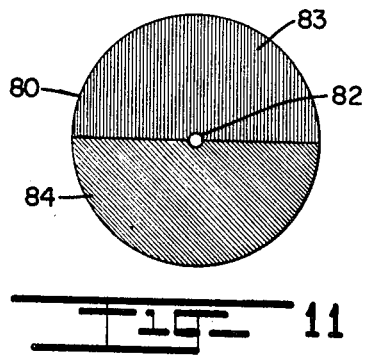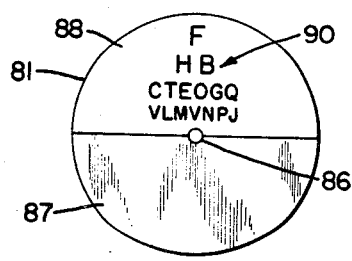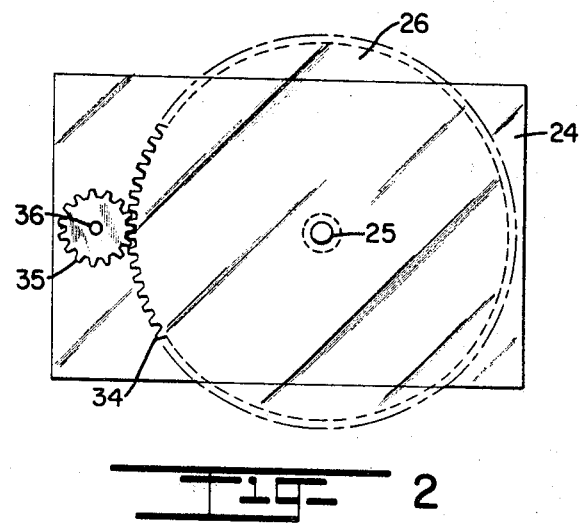

3,419,323
Patented Dec. 31, 1968

3,419,323
EYE TESTING AND TRAINING APPARA-
TUS INCORPORATING OPTICAL PROJEC-
TOR AND RELATIVELY ROTATABLE TAR-
GET TEMPLATES
Robert E. Lookabaugh, P.O. Box 267,
Lincoln, Nebr. 68501
Filed Aug. 5, 1963, Ser. No. 299,882
5 Claims. (Cl. 351—2)

This invention relates to a novel and improved method and means for conducting eye testing and vision training exercises, and has particular relation to rotations, pursuits, and fixations training procedures useful in visual rehabilitation.

It is customary in many types of eye testing or vision training programs either to advance or to selectively expose an image on a surface for viewing by the patient in different areas of the visual field. Characteristically, image movements may be circular, linear, or flashed to appear at different areas of the viewing surface. Here, it is important that such image movements be rhythmical in order to properly develop the primary visual functions with ease of progression through the various training stages. It will be apparent that smooth, rhythmical image movements are best effected by mechanical means; yet, in practice the different characteristic image movements should be accomplished using a single unit with minimum change or substitution between parts in progression from one movement to another, and in general the entire operation should be simplified and efficient.

It is therefore an object of the present invention to provide for a novel and improved device adaptable for use in conducting various eye testing and vision training programs which is simplified and efficient in operation, and wheren the device is capable of initiating a number of different characteristic image movements or of selectively exposing an image for viewing in a smooth, rhythmical manner.

It is another object of the present invention to make provision for a method and means for carrying out a program of developmental vision training in which the eyes are led through a series of smooth, rhythmical movements in following an image presented for viewing in either a rotational or linear direction on a viewing surface, or where the image or target is flashed at different areas on the viewing surface according to the exercise to be performed; furthermore, to progress through a series of different characteristic image movements as set forth either at constant or variable speeds using the same basic mechanical movement of the image-producing elements.

It is another object of the present invention to provide for a series of image-producing templates which can be selectively combined and rapidly interchanged for projecting and advancing light images on a viewing surface to perform rotations, pursuits and fixations training.

It is a further object of the present invention to provide for controlled mechanical and relative rotational movement between different sets of image-producing elements in such a way as to present for viewing in a smooth rhythmical manner either rotational or linear image movement, or flashed stationary images on a viewing surface, and in any selected meridian desired.

In accordance with the present invention, image-producing templates are supported across a light path in superimposed relation to one another, the templates having transparent patterns or openings which under relative movement will intersect to selectively pass light thereby forming light images or targets for projection onto a viewing surface. Different characteristic image movements are achieved merely by correlating the patterns on the templates and advancing one template with respect to the other so as to continually change the point or points of intersection of the patterns. In this manner, the light images projected can be advanced in different selected directions or paths across the viewing surface so as to be conformable for use in performing a number of different eye testing procedures or training exercises.

The above and other objects, advantages and features of the present invention will become more readily understood and appreciated from a consideration of the following detailed description of a preferred form of invention taken together with the accompanying drawings in which:

FIGURE 1 is a front elevational view of a preferred form of apparatus used in carrying out vision testing procedures and training exercises with parts thereof being schematically represented.

FIGURE 2 is a top plan view of the apparatus shown in FIGURE 1.

FIGURE 3 is a face view of one form of template used in rotations training, in accordance with the present invention.

FIGURE 4 is a face view of another form of template used in conducting rotations training exercises.

FIGURES 5 and 6 are face views of a template combination used in pursuits or versions training exercises, in accordance with the present invention.

FIGURES 7 and 8 are face views of a template combination used in fixations training exercises.

FIGURES 9 and 10 are face views of a modified form of template combination used in fixations training exercises in accordance with the present invention; and FIGURES 11 and 12 are face views of a template combination useful in performing the anaglyph method of vision training.

Referring in detail to the drawings, there is represented in somewhat schematic form in FIGURES 1 and 2 a preferred form of visual training apparatus 10 which is broadly comprised of a projection unit 12, a screen 13 and an image-producing device 14, the latter being positioned on the projection unit to form light images or targets for projection and advancement across the screen 13. The projection unit is of conventional form and for example may consist of a Thermofax Overhead Projection Unit manufactured by Minnesota Mining nad Manufacturing Co. For the purpose of illustration, the unit consists essentially of a housing 16 positioned on a stand S and the housing encloses a light source, not shown, which is reflected upwardly through a condensing lens in the top rectangular frame portion or stage 17. A projection head 18 includes a suitable lens and mirror system which is centered over the housing by means of a post 19, the lens and mirror system being adapted to magnify and project the light from the light source horizontally onto the viewing screen.

The preferred form of image-producing device 14 is designed for removable disposi ion on top of the frame portion or stage 17 of the housing unit, and in cooperation with a series of templates, as exemplified by those shown in FIGURES 3 through 12, will produce and control the movement of one or more light images or targets across the viewing screen. Conventionally, images may be formed for viewing by directing a light source through one or more limited openings in a template positioned across the light path, then projecting the light pattern so formed onto a viewing surface. For example, reference is made to my copending application filed May 29, 1963, Ser. No. 284,142, and entitled, Method and Apparatus for Examining Visual Fields; this application relates essentially to a method and means for determining and plotting defects in the visual field system by noting the patient's response to movement of a light image in or out of the field of vision. However, the present invention is characterized by the manner in which light images of various different forms are caused to undergo different characteristic movements, such as rotational, linear or random movements on the viewing screen in a smooth, rhythmical manner; or further can be selectively exposed at different areas in succession on the viewing screen for the purpose of leading the eyes through one or more training exercises. Of particular importance, the exercises can be carried out at constant or variable speeds using the same basic rotational movement while substituting templates to determine each different characteristic image movement. To this end, the device 14 is made up of a stationary base plate 24 on which is mounted a spindle 25 adapted to carry a lower platform 26 and upper platform 28. Preferably, the spindle is positioned in stationary relation on the base plate and has a lower stepped surface portion 30 to support the lower platform 26 and an upper stepped surface 32 for the upper platform 28. The base plate 24 is generally rectangular in configuration and composed of plastic or similar transparent material which will pass light from the light source upwardly therethrough without distortion. The lower platform 26 is in the form of a circular disk and similarly is composed of a transparent material provided with a center opening for disposition on the spindle 25. In order to rotate the lower platform, external teeth 34 on the periphery of the platform intermesh with a pinion gear 35 on a vertical drive shaft 36 from motor 37. The motor is preferably a variable speed motor having a rheostat 38 with speed setting 39, the rheostat being connected to an electric outlet 40 provided on the projection unit. When energized, the motor will drive the lower platform at a predetermined constant or variable speed by suitable regulation of the speed setting 39, or may be reversed in direction by the rheostat.

The upper platform is defined by a circular disk composed of a transparent material with a limited center opening to receive the upper end of the spindle. In this relation, the upper platform normally remains stationary with the lower platform being under constant rotation by the motor drive system, although it will be seen that the upper platform can be manually rotated or shifted with respect to the lower platform. Thus, the arrangement described provides essentially a combination of independently rotatable platforms aligned in spaced coaxial relation transversely across the light path of the projection unit for the purpose of supporting and controlling the movement of a pair of image-forming elements or templates removably placed on the platforms in a manner to be described.

In accordance with the present invention, each template is formed with a transparent or open pattern to selectively pass light therethrough for projection on the screen as a light image or target. By positioning a pair or combination of templates in superimposed relation and advancing one with respect to the other; the formation of the light image and its manner of advancement across the screen will be determined by intersection or traversal of the transparent portions. The widest latitude of change or variation in the characteristic movement of the image is established by relative rotational movement between the templates, and accordingly the transparent portions are formed to constantly vary the point or location of intersection of the patterns when under relative rotation in order to lend the desired characteristic movement to the resultant image formed on the viewing screen. This relationship is best typified by reference to the template patterns shown in FIGURES 3 to 10. Preferably, each template is relatively thin and of circular configuration for placement on the template supporting platforms 26 and 28, and each may be composed of a lightweight transparent material, such as clear plastic or vinyl acetate. In using transparent materials, one surface is preferably painted or otherwise coated with an opaque substance leaving transparent patterns in selected areas of the templates.

To lead the patient through a series of corrective exercises commonly referred to as "rotations," "pursuits," and "fixations" training exercises, the templates are designed for use either individually or in pairs. For example, either of the templates shown in FIGURES 3 and 4 are individually placed on the lower platform 26 and under rotation will be advanced in a circular motion on the screen for the purpose of teaching and refining both monocular and binocular rotating eye movements. In pursuits training, the template combinations shown in FIGURES 5 and 6 are placed on the lower and upper platforms, respectively, and upon rotation of the lower template with respect to the upper template will present a to and fro linear image movement on the screen; also, the upper template may be shifted to different meridians in order to present the same to and fro movement in a series of different selected areas on the screen. The templates shown in FIGURES 7 and 8 are positioned, respectively, on the lower and upper platform disks to train the eyes both monocularly and binocularly to follow images flashed in succession at different areas of the viewing surface; whereas the templates illustrated in FIGURES 9 and 10 are designed for more advanced fixation training to cause the eyes to imitate normal reading movements in a manner to be described. In general, though, the various different images presented and their manner of movement are controlled by mechanical rotation of the lower platform either at constant or variable speeds, and the different characteristic movements are brought about by selective substitution of the templates for rotation with respect to one another.

Considering in more detail the particular template forms illustrated for use in rotations training, in FIGURE 3 a template 42 is coated with an opaque material 43 to form a series of off-center, concentric circular transparent patterns 44. The template is provided with a center opening 45 for disposition over the spindle 25 and for placement upon the lower platform 26, the upper platform 28 is removed as it has no function in the rotations training exercise. In rotations training, the objective is to smooth rotational eye movements and accordingly mechanical rotation of the template is most desirable to provide smooth rhythmical image movements across the screen. Conventionally, rotations training is carried out first by exercising one eye at a time, or monocularly, starting at slower speeds and gradually increasing speeds over several sessions. This training is carried out either in a clockwise or counterclockwise direction, and the projected image of concentric circles on the screen as it is advanced in a circular path will lend some apparent depth when viewed by the patient. Alternatively, the template 48 shown in FIGURE 4 is formed with a center opening 47 and a spiral pattern 49; when positioned on the platform 26 and rotated, the spiral pattern will again lend some depth to the image as viewed by the patient. In this connection, circular or spiral patterns are used in rotations training since they are highly effective in smoothing eye movements; and as the rotations training procedure progresses, the eyes may be exercised binocularly so as to coordinate eye movements in following the rotating patterns.

In versions of persuits training, templates 50 and 51 shown in FIGURES 5 and 6 are employed in combination. Here, it will be noted that the template 50 has an oval transparent pattern 52 terminating in spaced inner ends 53, and the template 51 has a diametral slot-shaped pattern 54. The oval transparency 52 has its major axis formed essentially along a radial line extending from the center of the template and is of a length substantially equal to the radius of the template. Each template is suitably provided with a center opening 55 sized for insertion over the spindle 25, the template 50 being placed on the lower platform 26 and template 51 being placed on the platform 28. When the template 50 is rotated on the lower platform with respect to the stationary template 51 on the upper platform, the oval pattern 52 will advance across the slot 54 to form a single light spot or image moving to and fro across the screen. This can be visualized from a consideration of FIGURE 6 in which the oval 52 is represented in dotted form at various different positions with respect to the slot 54 as the lower template 50 is rotated in a clockwise direction. Starting at point A on the oval pattern, the image formed will gradually advance outwardly in a linear direction when the oval pattern is rotated from points A to B; under continued rotation from points B to C with respect to the slot, the image on the screen will move inwardly. Accordingly, the image will move back and forth in a linear direction on the screen by rotating the oval pattern across the light path and in front of the slot 54. The exercises can be repeated in any meridian by manually rotating the upper platform to shift the slotted pattern to the desired angle; and in practice it is desirable to conduct the exercises in horizontal, vertical and oblique meridians in order to best stimulate or develop muscular coordination. Again, it will be noted that one basic mechanical movement is required, that being to rotate the oval pattern to cause a linear or to and fro movement of the image on the screen. Again, the upper template is manually rotated with respect to the lower template only for the purpose of changing the meridian or area on the screen 13 in which the light spot appears.

In fixations training exercises, the templates 60 and 61 illustrated in FIGURES 7 and 8 may be employed, template 60 including a center opening 64 for positioning on the lower platform and having a transparent pattern in the form of arcuate slots or openings 63 arranged at random spaced intervals on the template. In turn, the template 61 has a center opening 65 for disposition on the upper platform and the pattern is defined by a series of spaced circular openings 66 and identification figures, not shown, may be printed in each of the openings. Under rotation, the random slots 63 on the lower template will in succession traverse the openings on the upper template so as to momentarily flash on the screen images of the openings or identification figures therein, thus requiring the eyes to jump or skip from one area of the screen to another. The lower template is rotated first at very slow speeds then gradually increased as the patient is able to accurately follow and identify the figures flashed on the screen. In order to alter the location of figures flashed on the screen, again it is merely necessary to manually rotate or shift the upper template with respect to the lower template.

In more advanced fixation training, templates 70 and 71 shown in FIGURES 9 and 10 may be positioned on the lower and upper platforms, respectively. The template 70 includes a center opening 72 and a series of arcuate openings 74 arranged together in a generally spiral configuration; whereas the template 71 has a center opening 75 and a slot-shaped opening 76. Most desirably, the template 71 is positioned on the platform so that its image is projected as a horizontal line on the screen, and in combination with the lower slots 74 will control the passage of light to present a succession of light spots appearing at spaced horizontal intervals either from left to right or right to left on the screen. In following the spots as they appear on the screen, the patient's eyes will imitate normal reading movements.

In general, the images produced can be viewed either monocularly or binocularly to improve muscle coordination and stereopsis ability. In monocular training, if desired various patterns may be covered with light filters, or for example by using various bichrome or plain polarized templates the instrument may be used in testing extrinsic muscle paralysis or paresis. In addition, peripheral retinal stimulation can be accomplished with the spiral pattern shown in FIGURE 4 as an aid to proper fixation ability, since central fixations start in the extramacular area and proceed to the fovea centralis, and for this purpose the spiral pattern will stimulate the peripheral areas of the retina.

In conducting the various exercises as described, the patient is seated alongside the projection unit in facing relation to the screen. In rotations training, the upper platform is of course removed and either the template 42 or 48 is positioned on the lower platform. For monocular training, a patch may be placed over one eye and the template is rotated at constant or variable speeds by the speed setting 39. For pursuits training, it is merely necessary to remove the rotation template 42 or 48 and to position the template 50 on the lower platform; then the upper platform 28 is replaced on the spindle and the template 51 positioned thereon. Again the lower platform and template 50 are rotated to cause an image to pass back and forth across the screen. As hereinbefore stated, the upper template and platform can be shifted to repeat the exercise in different meridians. To progress into fixations training, either the template 60 or 70 is substituted for template 50, and the template 61 or 71 substituted for the template 51. Under the same rotational movement, however, the image will be flashed or exposed at different areas on the screen and at constant or variable speeds as determined by controlling the speed setting.

Accordingly, the device of the present invention is useful not only in conducting various eye testing and training exercises, but specifically to teach and refine both monocular and binocular eye movements, such as, rotating eye movements, to and fro or linear movements, and "jump" movements. Also, the instrument is capable of rapidly and smoothly progressing from rotations training through pursuits and fixations training procedures merely by removal of the upper platform, placement of a template on the lower platform, replacement of the upper platform and disposition of the combination template thereon. Thus the device is simple to operate as well as being inexpensive and easily conformable for use with different types of projection units while affording a professional approach to orthoptic procedures. As a visual training instrument, it is useful in providing a fast, easy and yet inexpensive method of refining the basic visual skills as a prerequisite to advanced fusion, stereopsis and reading training, since for instance the image may easily be projected in any meridian and advanced under variable speeds; or in fixation training will provide variable speed, erratic location of the image as well as smooth one-line jump fixations while requiring positive identification by the patient.

The method and apparatus of the present invention similarly can be utilized as a means for balancing and coordinating eye muscles, for example, using the Anaglyph method with light control and which is of particular value in eliminating suppression and minimizing amblyopia. One mode of carrying out this technique involves the use of templates 80 and 81 as shown in FIGURES 11 and 12. Here, the lower template 80 is provided with a central opening 82 for disposition on the lower platform, the template being normally transparent with a semi-circular portion 83 enameled or colored red and a semi-circular portion 84 colored green. The template 81 is similarly formed of a transparent material having a central opening 86 for disposition over the spindle and placement on the upper platform 28. A light-transmitting pattern is formed by covering a semi-circular portion of the upper template with an opaque coating 87 leaving a semi-circular transparent portion 88 on which is placed a fixation target or targets 90 which may be suitably defined as identification letters, figures or numbers of varying sizes. In accordance with conventional practice, a red filter is placed over one eye and a green filter placed over the other eye so that red images presented or projected on the viewing surface can be seen only with the eye having the red filter placed over it, and the green images can be viewed only through the green filter. By rotating the lower template 80, the identification letters defining the fixation target 90 and the upper template will be projected in succession on a red and green background so as to be alternately visible to each eye. For each cycle of rotation, the image will of course be partially visible to both eyes when part of the identification letters is projected on a green background and part is projected on a red background at the same time. In this relation, the areas on the lower template covered by each color may be varied so that a major portion of the template is colored red and the remaining portion colored green, thereby making the image visible to one eye over a longer time period for each revolution of the lower template. Moreover, the extent of visibility for each eye may be regulated using different colored light filters placed either in front of the eyes or on the stage 17 of the instrument, for example, to force the patient to use the weaker eye predominately in discerning the image on the screen. In general, therefore, the image projected from the upper template will remain stationary but is alternately controlled by the background color of the lower rotating template for viewing by either eye in rapid succession. In addition, the upper template may be shifted or manually rotated so that the image will be projected on different selected areas of the screen.

In a similar manner, the apparatus of the present invention may be utilized in determining the integrity of the fiber layer of the nerve cells commonly referred to as Henle's Fiber Layer, within the macular region of the retina, and the technique employed is termed as the Haidinger Brush Test. Although not illustrated, the test is performed using a plane polarizing filter placed on the lower rotating platform 26, and a template is placed on the upper platform 28 which may take the form of a partially occluded disk member, such as, the template 81 illustrated in FIGURE 12. In this way, when light is passed through the superimposed templates, the identification figures 90 on the upper template will define a stationary or fixation target on the screen. By placing a blue filter before the patient's eyes and rotating the polarizing filter on the lower platform, a shadowy rotating image will be formed by the polarizing filter. If the patient's fiber layer is functioning properly he will be able to perceive the shadowy image and may so indicate by identifying the direction of rotation of the image. This direction may be conveniently reversed either by reversing the direction of rotation of the polarizing template or by placing a layer of cellophane over the blue filter, the latter being effective to reverse the apparent direction of rotation of the image. If the rotating shadow is not perceived by the patient, indications are that the fiber layer of the nerve cells is not functioning; and although not definitely established in practice, it has been theorized that leoptic or othroptic training procedures can then be undertaken to improve the acuity in the eye. Preferably, this test is conducted monocularly so that first one eye and then the other is tested using a blue filter with or without a cellophane layer.

The disks or templates described and shown in FIGURES 3 to 12 are for the most part merely illustrative of the important features and principles of the present invention, and accordingly may undergo suitable variation or change according to the intended application. For instance, the images may be projected on a transparent screen with the patient being positioned on the side of the screen opposite the projection apparatus for viewing the images presented. In construction, the patterns may be formed on the templates in a number of different ways, for example, by cutting sections from an opaque material to define the patterns, or by applying a suitable opaque coating over a transparent template leaving only the desired pattern formation as described. Accordingly, the templates may be suitably composed of clear plastic, cardboard, metal or wood according to the intended use and manner of forming patterns thereon. In this relation, the templates may be of sufficient strength so as to be self-supporting and not require separate supporting means as defined by the platforms 26 and 38; however, some direct means of mechanical engagement must be provided between the lower template and motor drive system. The point of driving contact on the lower platform may either be at the center or at any desired point on the periphery; or the rotating disk may be propelled by hand or by electric motor drive as described, the important relationship being that between the superimposed templates which will permit independent rotation and present different characteristic image movements. It is therefore to be understood that various modifications and changes may be made in the construction and arrangement of parts comprising the present invention without departing from the spirit and scope thereof as defined by the appended claims.

What is claimed is:

1. A vision testing and training apparatus comprising a light projection unit including an upwardly directed light source and optical means for projecting light from said light source upon a viewing surface, a pair of image-producing templates being opaque to light and having light-transmitting patterns formed on each template, means for supporting said templates for independent rotation transversely across and in centered relation to the path of light from said light source and in superimposed relation to one another, said supporting means including a vertical stepped spindle centered with said light source and a pair of horizontally disposed transparent platforms removably and rotatably mounted on the stepped portions of said spindle for supporting the respective templates, said light-transmitting patterns cooperating to produce a light image upon the viewing surface by restricting the passage of light from said light source through intersecting light-transmitting patterns one of said platforms being manually adjustable, and motor drive means, including speed control means, engageable with the other platform to rotate one template with respect to the other template to selectively and successively vary the points of intersection of said light-transmitting patterns whereby to vary the location and character of light images produced upon the viewing surface.

2. In a vision testing and training aparatus according to claim 1, said one of said templates being characterized by having an oval-shaped transparent pattern, and the other of said templates having a slot-shaped transparent pattern whereupon rotation of said one template to pass the oval-shaped pattern across the slot-shaped pattern a light image is projected therethrough and advanced in a linear direction to and fro across at least a portion of the viewing surface.

3. In a vision testing and training apparatus according to claim 1, said one template having a pattern defined by a series of limited openings at random spaced intervals, and the other of said templates having a pattern defined by a series of openings each disposed for successive alignment with one of the openings on said one template upon rotation of said one template whereby to project a series of light images in succession upon different areas of the viewing surface.

4. In a vision testing and training apparatus according to claim 1, the light-transmitting pattern for said one template being characterized by having light filters of different colors rotatable into alignment with the light-transmitting pattern on the other of said templates whereby to vary the background color of the images presented on the viewing surfaces.

5. In a vision testing and training apparatus according to claim 1, said one template having a polarizing filter thereon whereupon rotation of said one template an image in the form of a rotating shadow is presented for viewing on the viewing surface by the projection of light through said filter.

References Cited

UNITED STATES PATENTS

| | | | |
|---|---|---|---|
| 886,772 | 5/1908 | Dodge | 351—17 |
| 1,698,013 | 1/1929 | De Zeng | 350—30 |
| 1,797,544 | 3/1931 | Cameron | 351—30 |
| 2,206,303 | 7/1940 | Neumueller et al. | 351—25 |
| 2,213,711 | 9/1940 | Lueck | 351—30 |
| 2,528,681 | 11/1950 | Berssenbrugge | 88—24 |
| 2,717,529 | 9/1955 | Alexander | 351—31 |
| 2,959,094 | 11/1960 | Kosma | 88—24 |
| 3,044,348 | 7/1962 | Cueppers et al. | 351—25 X |

FOREIGN PATENTS 1,313,468  11/1962  France.

DAVID H. RUBIN, *Primary Examiner.*

U.S. Cl. X.R.

351—30, 36; 88—24; 128—76.5